United States Patent [19]

Uchida et al.

[11] Patent Number: 5,047,305

[45] Date of Patent: Sep. 10, 1991

[54] ELECTROSTATIC-IMAGE DEVELOPING POLYESTER TONER WITH RELEASE AGENT

[75] Inventors: Masafumi Uchida; Jiro Takahashi; Hiroyuki Takagiwa; Akitoshi Matsubara; Toshiko Yajima, all of Hachioji, Japan

[73] Assignee: Konica Corporation, Tokyo, Japan

[21] Appl. No.: 308,406

[22] Filed: Feb. 9, 1989

[51] Int. Cl.$^5$ .................. G03G 9/087; G03G 9/097
[52] U.S. Cl. .................. 430/110; 430/109; 430/111
[58] Field of Search .................. 430/109, 904, 110

[56] References Cited

U.S. PATENT DOCUMENTS

| | | | |
|---|---|---|---|
| 4,533,614 | 8/1985 | Fukumoto et al. | 430/904 X |
| 4,795,689 | 1/1989 | Matsubara et al. | 430/109 X |
| 4,933,252 | 6/1990 | Nishikawa et al. | 430/109 |

FOREIGN PATENT DOCUMENTS

| | | | |
|---|---|---|---|
| 58-100139 | 6/1983 | Japan | 430/109 |
| 61-284772 | 12/1986 | Japan | 430/109 |

*Primary Examiner*—Roland Martin
*Attorney, Agent, or Firm*—Jordan B. Bierman

[57] ABSTRACT

An electrostatic-image developing toner containing a polyester prepared by condensation polymerization of a monomer composition consisting of:

Component (1): a polyvalent monomer having not less than trivalency,

Component (2): an aromatic dicarboxylic acid, and

Component (3): an aliphatic dialcohol, and a releasing agent having some range of a penetration, is disclosed. The total of an acid value (AV) and a hydroxyl value (OHV) of said polyester comprises a value of not less than 30 and not more than 80.

14 Claims, No Drawings

ELECTROSTATIC-IMAGE DEVELOPING POLYESTER TONER WITH RELEASE AGENT

FIELD OF THE INVENTION

This invention relates to an electrostatic image developer applicable to development of an electrostatic latent image formed on surface of a latent image carrier in such methods as an electrophotographic method, an electrostatic recording method and an electrostatic printing method.

More particularly, this invention relates to an electrostatic image developer comprising toners and carriers.

BACKGROUND OF THE INVENTION

As for the methods of forming a visible image from an image source, the methods such as an electrophotographic method, an electrostatic recording method, an electrostatic printing method and so forth in which an electrostatic latent image is used as an intermediate have heretofore widely been utilized.

In the electrophotographic method, for example, a copy image is formed in the following manner.

A uniform electrostatic charge is applied to a latent image carrying means having a light-sensitive layer made of a photoconductive material, and an electrostatic latent image corresponding to an image source is then formed on the surface of the latent image carrying means by imagewise exposure. The resulting electrostatic latent image is developed with a developer to form a toner image. The toner image is transferred to a recording material such as a paper sheet and is then heated or pressured for fixing to form a copy image. On the other hand, the latent image carrying means is electrically neutralized after completing the image transfer process and untransferred toner remaining on the latent image carrying means is cleaned off. Then, the latent image carrying means is used for the next copy image formation.

Heretofore, there have been known electrostatic image developers including, for example, a single-component type developer consisting of magnetic toners only and a two-component type developer comprising toners and carriers. Such two-component type developers have the advantage that the frictional charge of the toners can be controlled relatively easily, because the toners are charged by friction with the carriers.

In order to form excellent and stable copy images with a substantially high image density and no fog in repeated use it be required that the frictional charge of toners is constantly maintained at a proper level. To meet this requirement, it is essential to effectively prevent the carriers or the developer transporting means from contamination with toner materials.

It is preferable to fix toners by a heat- roller fixing method, because a high heat efficiency and a high-speed fixation are feasible. In the heat-roller fixing method, however, so-called offset phenomenon is liable to be caused, where a part of toners forming an image are transferred to the surface of a heat-roller when the toners are fixed, and it is further transferred to a following recording material, so that images are stained. Therefore, the toners are required to have an excellent offset resistance.

In case of forming images repeatedly, temperature of a heat-roller is liable to be lowered, because heat is transferred considerably to a recording material and, resultingly, there is liable to be caused a winding trouble where a recording material winds around surface of a heat-roller. Toners are, therefore, required to have an excellent anti-winding property.

Taking the above-mentioned requirements into consideration, there has so far been a proposal for the toner containing a releasing agent dispersed in a binder resin comprising a polyester prepared by condensation-polymerization of a monomer composition consisting of a polyvalent monomer having not less than trivalency, an aromatic dicarboxylic acid and a bisphenol type alcohol. [Refer to Japanese Patent Publication Open to Public Inspection (hereinafter called Japanese Patent O.P.I. Publication) No. 57-208559 (1985)].

However, the above-mentioned technology involves the problems. One of them is as follows: when repeating copying operation for a long time, toner particles are liable to be finely powdered because they are destroyed by external mechanical force such as agitation applied to them in a developing unit, and fine powder is fused to the surface of the carrier particles so as to make frictional electrification of both toners and carriers unstable, which in turn results in making developability unstable.

Further, another problem involved is as follows; the foregoing releasing agent dispersed in the binder resin is liable to drop off from toner particles, and the dropped releasing agent contaminates surface of a latent image carrying means, carrier particles, a developer transporting means and so forth. Such problems are liable to cause image density degradation, fogging and contamination of a machine due to toner flying. In addition, the toners without the releasing agent deteriorate the properties of fixing, anti-offset and anti-winding in a fixing process after developing and transferring.

The above-mentioned problems can be solved by a method in which an aliphatic alcohol is used as dialcohol. In this method molecular chains of polyesters become more flexible, and therefore, mechanical energy produced by agitating a developer is converted into kinetic energy of the molecular chains of the polyesters, so that the toner particles are subject to considerably reduced mechanical stress and are effectively prevented from being destroyed.

At present, however, a composite material of a binder resin and a releasing agent is not able to provide sufficient performance, while the binder resin itself is less subject to destruction in a condition of considerably intensive stress exerted on the toner particles.

In other words, there are the following problems still remaining unsolved.

(1) Polyesters for binder resins contained in toner particles become more fragile under conditions of temperature and relative humidity as low as 10° C. and 20%, respectively.

Therefore, when the toner particles are Subjected to external mechanical force such as agitation in a developing unit, they are destroyed to fine powder and the fine powder is fused to the surface of the carriers, so that the frictional charge generated between toners and carriers becomes unstable, which results in making developability unstable.

As a result, the problems of the prior art remain unsolved; the releasing agent drops off and dropped contaminates the carriers and means for carrying the latent image and transporting the developer; finally, image density degradation, fog, off-set, winding of the recording material and the like are caused.

(2) When forming an image in under ordinary conditions of temperature and humidity of 20° C. and RH60% in an intermittent mode where operation of a machine stops whenever image formation is finished and a toner consumption rate per agitation time of toner is relatively low, average staying time of toners in a developing unit becomes longer and agitating time of developers also becomes longer. The developers are therefore subjected to more mechanical stress, which results in destroying the toner particles to fine powders, and causing drop-off of the releasing agents, so that the same problems as mentioned above still remain unsolved.

(3) Toner blocking by dropping off of a releasing agent is sometimes noted at high temperature and humidity of 30° C. and RH80%, and when using the toners for a long period of time under such conditions, they are liable to form a lump in a developing unit and to cause blank areas on copy images.

SUMMARY OF THE INVENTION

It is an object of the invention to provide an electrostatic-image developing toner free of the above-mentioned problems and, more particularly, to provide the toner subject to no destruction of the toner particles to fine powder and free of drop-off of a releasing agent, which provides stable developability and excellent durability enabling the formation of a copy image with high density and no fog for prolonged period of time.

Another object of the invention is to provide the toner from which the releasing agents hardly drop off and which can provide the excellent properties such as fixing, anti-offset and anti-winding.

A further object of the invention is to provide the toner subject to no dropping-off of the releasing agents and free of toner lump and blank areas on copy images.

DETAILED DESCRIPTION OF THE INVENTION

After the inventors devoted themselves to studying to achieve the above-mentioned objects of the invention, it has become apparent that the following combination of a binder resin and a releasing agent provides superior performance.

To be more concrete, the electrostatic-image developing toner comprises a polyester prepared by condensation polymerization of the monomer composition consisting of the following components (1) through (3);
Component (1): a polyvalent monomer having not less than trivalency,
Component (2): an aromatic dicarboxylic acid, and
Component (3): an aliphatic dialcohol The toner is characterized in containing a specific polyester as a binder resin, as well as a releasing agent, where the total of the acid value (AV) and the hydroxyl value (OHV) is not less than 30 and not more than 80.

The acid value (AV) is defined by mg of potassium hydroxide necessary to neutralize the acid contained in one gram of a sample, while the hydroxyl value (OHV) is defined by mg of potassium hydroxide necessary to neutralize acetic acid combined with a hydroxyl group when one gram of a sample is acetylated according to The Standard Fats and Oils Analytical Testing Methods provided by The Japan Oil Chemists' Society.

With respect to polyesters, the total of AV and OHV of a polyester means the number of the terminal groups in a moleculer chain of a polymer. The inventors have discovered that this total value affects dropping off of the releasing agent to a large extent, and have come to complete the invention.

The polyester prepared by using an aliphatic dialcohol and having the total of an AV value and an OHV value in the range of 30 to 80, which is incorporated into a toner as a binder resin can efficiently prevent a releasing agent from dropping off from the toner and further provides the toner with such a property that it is hardly pulverized. Therefore, 1) it is possible to form stable copy images with high density and no fog in a condition either of low temperature and low humidity or of ordinary temperature and ordinary humidity, and further the properties of the toner such as fixing, hot off-set and winding on a heat-roller can be improved; and 2) it is also possible to prevent any blank areas on copy images.

It is known that kneaded mixture of a binder resin and a releasing agent has a sea-and-island structure in which the binder resin is regarded as a sea while the releasing agent is the island, respectively, by controlling their addition amounts.

Taking this structure into consideration, the total of an AV and an OHV exceeding 80 will reduce an interaction between the binder resin and the alkyl groups occupying a greater part of a molecular structure in the releasing agent and resulting in rapidly reducing the binding strength of the releasing agent with the binder resin, so that the releasing agent may readily be dropped off when receiving a stress.

On the other hand, it has been well-known that a difference of a melting viscosity between a binder resin and a releasing agent is a parameter essential to form a sea-and-island structure in kneading. The reason is that the less the difference is, the more finely the releasing agent is dispersed.

The total of AV and OHV smaller than 30, which corresponds to too large molecular weight of a polyester. i.e., a binder resin, will result in increasing a melting viscosity, so that the viscosity difference between the binder resin and the releasing agent intrinsically having a low melting viscosity becomes larger. Accordingly, in a sea-and-island structure, the domain of a releasing agent (the island) becomes larger, and the originally dropped-off releasing agents present in toners after pulverization and classification, are liable to contaminate a latent image carrying means, carrier particles, a developer transporting means and so forth.

It has further been discovered that not only the total of the terminal groups but also the ratio thereof is essential for preventing a releasing agent from dropping off. For this purpose, an OHV/AV ratio is preferably not higher than 5.0, more preferably not higher than 2.0 and, further more preferably lower than 1.2. The reason why the above-given ratios are preferable is still not clear. However, a higher OHV/AV ratio tends to rapidly accelerate self-crosslinking in kneading. From this fact, it may be presumed that a melting viscosity is excessively increased to result in increasing viscosity difference between a polyester and a releasing agent, so that the dropped-off releasing agents are present in a toner after pulverization and classification.

The constitution of the invention will now be detailed.

In the invention, there is used a polyester as the binder resin, which is prepared by condensation polymerization reaction of the monomer composition containing the foregoing components (1) through (3).

(Hereinafter referred to as the polyester of the invention.)

The polyvalent monomers having not less than trivalency, which are used as the foregoing component (1), include, for example, 1,2,4-benzenetricarboxylic acid, 1,3,5-benzenetricarboxylic acid, 1,2,4-cyclohexanetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxy)methane, 1,2,7,8-octanetetracarboxylic acid, Empol trimeric acid, anhydrides or esters thereof, and so forth.

Of the above-mentioned polyvalent monomers having not less than trivalency, an aromatic polyvalent carboxylic acid is preferably used in the polyesters of the invention prepared by using an aliphatic dialcohol. Further, benzenetricarboxylic acid and the anhydrides and esters thereof can provide a stable frictional electrification.

Electrification of the polyesters prepared by using an aliphatic dialcohol is liable to be slow at an initial stage, because of their much less $\pi$ electrons than those prepared by using a bisphenol type alcohol. It is expected, however, that such slow electrification at the initial stage can be prevented by the polyesters prepared in combination with benzenetricarboxylic acids and anhydrides or esters thereof as the polyvalent monomer having not less than trivalency.

An addition rate of the polyvalent monomers having not less than trivalency is preferably at a range of 1 to 30 mol% of the total monomers. The polyesters prepared by using the polyvalent monomers at this range of the addition rate contributes further to preventing dropping-off of a releasing agent. The reasons are that the polyesters prepared as such are excellent in compatibility with a releasing agent having a relatively lower molecular weight and, therefore, that the releasing agents can be dispersed finely and uniformly into resins, so that their binding strength to the resins can be increased. The addition rate is more preferably at the range of 1 to 15 mol% of the total monomers.

The aromatic dicarboxylic acids serving as the foregoing component (2) include, for example, phthalic acid, isophthalic acid, terephthalic acid, the anhydrides or esters thereof, and so forth.

It is also allowed to use the above-mentioned aromatic dicarboxylic acid and other dicarboxylic acid in combination. Such other dicarboxylic acids include, for example, maleic acid, fumaric acid, mesaconic acid, citraconic acid, itaconic acid, glutaconic acid, cyclohexanedicarboxlic acid, succinic acid, adipic acid, sebacic acid, malonic acid, the anhydrides or lower alkyl esters thereof, linoleic acid dimer, and other bifunctional organic acid monomer. An addition rate of the other dicarboxylic acids is preferably not more than 30 mol% of the total dicarboxylic acids. If the addition rate is too large, the glass transition point Tg of the polyesters is lowered, so that a blank area is liable to occur in a solid portion.

The aliphatic dialcohols serving as the above-mentioned component (3) have preferably 2 to 10 carbon atoms in order to provide toners having further less fine toner powder liable to be fused on surface of carrier particles.

Aliphatic dialcohols having less than 2 carbon atoms provide the polyesters with insufficient flexibility of the molecular chains, and when the number of carbon atoms exceed ten, the flexibility is sufficient and pulverization of the toners can be readily prevented. However, the toners are liable to be plastically deformed on carriers and, therefore, to be fused to them. In addition, Tg is seriously lowered and toner lumps are therefore liable to be produced in a developing unit, which results in causing a blank area in a solid portion.

For the purpose of more effectively preventing a fine powder production in a condition of a high temperature and a high humidity, it is particularly preferable to use an aliphatic dialcohol having branched chains at an addition rate of not less than 50 mol% of the total aliphatic dialcohol. A branched chain is defined by a carbon chain other than a principal chain, provided that a linear chain connecting carbon atoms between two OH groups is a principal chain.

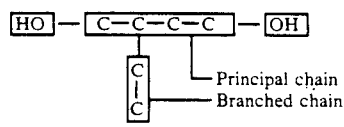

When such aliphatic dialcohol having branched chains is added by not less than 50 mol%, a density of the ester groups in a polyester become so low that water absorption can be controlled to a lower level, which is considered to be effective for preventing a deterioration of a polyester.

The above-mentioned aliphatic dialcohols include, for example, the following ones. Namely,
1) aliphatic dialcohols having branched chains include the following ones:
propylene glycol (1,2-propanediol),
1,2-butanediol,
1,3-butanediol,
2,3-butanediol,
neopentyl glycol,
3-methylpentane-1,3,5-triol,
1,2-hexanediol,
2,5-hexanediol,
2-methyl-2,4-pentanediol,
3-methyl-1,5-pentanediol,
2-ethyl-1,3-hexanediol, and so forth:
2) aliphatic dialcohols having no branched chain include the following ones:
ethylene glycol.
1,3-propanediol,
1,4-butanediol,
diethylene glycol,
2-butene-1,4-diol,
1,5-pentanediol,
1,6-hexanediol,
dipropylene glycol,
triethylene glycol,
tetraethylene glycol,
tripropylene glycol,
pentaethylene glycol, and so forth.

It is allowed to use the above-given aliphatic dialcohols and other dialcohols in combination. Such other dialcohols include, for example, 1,4-bis(hydroxymethyl)-cyclohexane, bisphenol A, hydrogenated bisphenol A, etherified bisphenols such as polyoxyethylene bisphenol A and polyoxypropylene bisphenol A, and so forth. An addition rate of the other dialcohols is preferably not more than 30 mol% of the total dialcohols. The excessive addition of the other dialcohols makes a molecular chain less flexibile, so that a toner is liable to be finely powdered and a developer is liable to get less durable, especially either in forming an image in a condition of low temperature and humidity or in forming it intermittently.

Further, a softening point (Tsp) of the polyesters of the invention is preferably at a range of 90 to 170° C., and more preferably 100 to 160° C. If Tsp is too low, the toner particles are liable to be destroyed to fine powder, which is fused on carriers, and there is further liable to be caused an offset phenomenon and a blank area in a solid portion in a condition of high temperature and humidity. On the other hand, too high Tsp makes a polyester less compatible with a releasing agent, and therefore, the releasing agent liable to drop off, which results in causing contamination of carriers and widing on a heat-roller.

A softening point Tsp is defined by a temperature corresponding to h/2, provided that h is height of an S letter curve in a temperature-plunger descending level graph (softening flow curve), which is illustrated based on the following conditions;
sample quantity : weight of a specific gravity × 1 cm$^3$,
loading : 20 kg/cm$^2$,
diameter of nozzle: 1 mm,
preheating : 80° C., 10 minutes,
raising speed of temperature: 6° C./minute
flow tester : koka- type CFT-500 made by Shimazu Seisakusho Ltd.

A glass transition point (Tg) of the polyesters of the invention is preferably at a range of 50 to 70° C. Too low Tg is liable to cause a blank area in a solid portion in a condition of high temperature and humidity. On the other hand, too high Tg makes a fixing property worse.

A glass transition point (Tg) is determined in the following manner by making use of a differential scanning calorimeter, 'low temperature DSC', manufactured by Rigaku-Denki Company;
1) a powdered sample of 30mg is put in an aluminium pan and is then heated up from 20° C. to 100° C. at a rate of 10° C. per minute: 2) the sample is allowed to stand at 100° C. for 3 minutes and is then cooled down by air to 20° C.; 3) thereafter, the sample is heated at a rate of 10° C. per minute to obtain a DSC thermogram, and in the glass transition area on the DSC thermogram, Tg is indicated by a temperature corresponding to a crossing point of an extension line of a base line below a glass transition point and a tangent with a maximum gradient between a foot to a peak of the thermogram.

The electrostatic-image developing toners of the invention contain a binder resin comprising of the polyesters of the invention and a releasing agent as an essential component.

The above-mentioned releasing agents include a polyolefin, a fatty acid metal salt, a fatty acid ester, a partially saponified fatty acid ester, a higher alcohol, a fluid or solid paraffin wax, an amide type wax, a polyvalent alcohol ester, and a wax of the mixtures thereof.

The above-mentioned polyolefins include, for example, the resins of polypropylene, polyethylene, polybutene, and the like.

The above-mentioned fatty acid metal salts include, for example, a zinc, magnesium, calcium or the like salt of maleic acid: a zinc, cadmium, barium, lead, iron, nickel, cobalt, copper, aluminium, magnesium or the like salt of stearic acid: a dibasic lead stearate: a zinc, magnesium, iron, cobalt, copper, lead, calcium or the like salt of oleic acid; on aluminium, calcium or the like salt of palmitic acid; a lead caprate; a lead caproate; a zinc, cobalt or the like salt of linilic acid; calcium ricinolate; a zinc, cadmium or the like salt of ricinolic acid; the mixtures thereof; and so forth.

The above-mentioned fatty acid esters include, for example, ethyl maleate, butyl maleate, methyl stearate, butyl stearate, cetyl palmitate, a montanic acid ethylene glycol ester, and so forth.

The above-mentioned partially saponified fatty acid esters include, for example, a calcium salt of partially saponified montanic acid ester, and so forth.

The above-mentioned higher alcohols include, for example, dodecyl alcohol, lauryl alcohol, myristyl, alcohol, palmityl alcohol, stearyl alcohol, aralkyl alcohol, behenyl alcohol, and so forth.

The above-mentioned paraffin waxes include, for example, natural paraffin, microwax, synthetic paraffin, chlorinated hydrocarbon, and so forth.

The above-mentioned amide type waxes include, for example, stearic acid amide, oleic acid amide, palmitic acid amide, lauric acid amide, behenic acid amide; methylenebisstearoamide, ethylenebisstearoamide, and so forth.

The above-mentioned polyvalent alcohol esters include, for example, glycerol stearate, glycerol linoleate, glycerol monobehenate, . sorbitan monostearate, propyleneglycol monostearate, sorbitan trioleate, and so forth.

Among the above-given releasing agents, it is preferable to use those having a penetration of not more than 4, specified in JIS K2235-1980. The releasing agents having a penetration of not more than 4, more effectively prevent carrier particles, a latent-image carrying means, a developer transporting means and so forth from causing a filming phenomenon with the releasing agent.

A melting point of a releasing agent is preferably 60 to 160° C. Too high melting point deteriorates an anti-offset property, while too low melting point deteriorates a toner preservability. A melting point is measured in the following manner; A slender glass tube into which small amount of a sample is put is dipped in a sulfuric acid bath and heated to inspect visually a melting point where the sample melts to transparent liquid.

A preferable addition amount of a releasing agent is 1 to 20 parts by weight per 100 parts by weight of a binder resin. The too small addition amount is liable to cause offset and winding. The excessive addition amount is liable to produce a large flocculates of a releasing agent in a polyester and contaminate carrier particles and so forth even if the releasing agents does not drop off.

If required, the electrostatic-image developing toners of the invention is also allowed to contain the additives such as a colorant, a charge controller and so forth.

The above-mentioned colorants include, for example, carbon black, Nigrosine dye (C.I. No. 50415B), Aniline Blue (C.I. No. 50405), Charco Oil Blue (C.I. No. Azoic Blue 3). Chrome Yellow (C.I. No. 14090), Ultramarine Blue (C.1. No. 77103), Du Pont Oil Red (C.I. No. 26105), Quinoline Yellow (C.I. No. 47005), Methylene Blue Chloride (C.I. No. 52015), Phthalocyanine Blue (C.I. No. 74160), Malachite Green Oxalate (C.I. No. 42000), Lump Black (C.I. No. 77266), Rose Bengale (C.I. No. 45435), the mixtures thereof. and so forth. An addition rate of a colorant is preferably 1 to 20 parts by weight per 100 parts by weight of binder resins.

Among the above-mentioned charge controller, the negative charge type ones include, for example, 2:1 type metal-containing azo dyes disclosed in Japanese Patent Publication Open to Public Inspection (hereinafter referred to as Japanese Patent O.P.I. Publication) Nos. 57-141452/1982, 58-7645/1983, 58-111049/1983, 57-167033/1982 and 58-185653/1983, Japanese Patent Examined Publication No. 44-6397/9969, and so forth: the metal complexes of an aromatic oxycarboxylic acid and an aromatic dicarboxylic acid diclosed in Japanese Patent O.P.I. Publication Nos. 57-104940/1982, 57-111541/1982, 57-124357/1982 and 53-127726/1978, and so forth; the derivatives of sulfonamide, sulfonic acid and a sulfonate of a copper phthalocyanine dye, disclosed in Japanese Patent O.P.I. Publication No. 52-45931/1977: The positiVe charge type ones include. for example, the quaternary ammonium compounds disclosed in Japanese Patent O.P.I. Publication Nos. 49-51951/1974 and 52-10141/1977, and so forth; the alkylpyridinium compounds disclosed in Japanese Patent O.P.I. Publication Nos. 56-11461/1981 and 54-158932/1979, U.S. Pat. No. 4,254,205, and so forth: alkylpicolinium compounds; Nigrosine type dyes such as Nigrosine SO. Nigrosine EX and so forth; addition condensation products disclosed in Japanese Patent Examined Publication No. 49-80320/1974.

The mixture of the polyester of the invention, a releasing agent and the other toner components which are added if required is melted with kneading and cooled down. After then, the kneaded mixture is pulverized and classified to prepare a toner having a prescribed average particle size.

The electrostatic-image developing toners of the invention may be applied for either single component type or dual component type developer.

EXAMPLE

The examples of the invention will now be detailed. It is, however, to be understood that the invention shall not be limited thereto.

Preparation of Polyesters

Dicarboxylic acid and dialcohol shown in Table-I were put into a 1-liter four-neck round bottom flask equipped with a thermometer, a stainless-steel stirrer, a glass tube for introducing nitrogen-gas and a reflux condenser, and the flask was heated on a mantle-heater keeping its inside inert by introducing nitrogen gas. After adding 0.05 g of dibutyl tin oxide and performing reaction at 200° C., a polyvalent monomer having not less than trivalence shown in Table-1 was added for further reaction to prepare the polyesters of the invention No. 1 through No. 5 and the comparative polyesters No. 6 through No. 8.

Table-2 shows acid values (AV), hydroxyl group values (OHV), OHV+AV values, ratios OHV/AV. softening point (Tsp) and glass transition point (Tg) of the individual polyesters.

Preparation of toner

After mixing the toner components shown in Table-3 by a V-type blender and then being melted for kneading by a double roll kneader, the kneaded mixture was cooled, coarsely pulverized with a hummer-mill, finely pulverized With a jet-mill, and then classified with an air classifier, to prepare the toners of the invention No. 1 through No. 6 and the comparative toners No. 7 through No. 10, each having an average particle size of 11.0 μm.

TABLE 1

| | Monomer Composition for Polyester | | | | | | | | | |
|---|---|---|---|---|---|---|---|---|---|---|
| | Acid Component | | | Alcohol Component | | | | | | |
| Polyester Sample No. | Polyvalent Monomer of not less than 3 valency TMA | Aromatic dicarboxylic acid | | Aliphatic dialcohol | | | | | | Non-aliphatic dialcohol |
| | | TPA | IPA | EG | PG | NPG | 1,4BD | DEG | TEG | BPA.PO | BPA.EO |
| 1 | 58 g (12%) | 381 g (88%) | — | — | 170 g (80%) | — | — | — | 84 g (20%) | — | — |
| 2 | 77 g (25%) | 315 g (75%) | — | — | — | 180 g (70%) | — | 89 g (30%) | — | — | — |
| 3 | 248 g (60%) | 125 g (35%) | 18 g (5%) | 52 g (30%) | — | 155 g (60%) | 25 g (10%) | — | — | — | — |
| 4 | 31 g (6%) | 416 g (94%) | — | 51 g (30%) | 134 g (65%) | — | 12 g (5%) | — | — | — | — |
| 5 | 58 g (12%) | 381 g (88%) | — | 68 g (40%) | 115 g (55%) | — | — | — | 21 g (5%) | — | — |
| 6 | 248 g (60%) | 143 g (40%) | — | — | — | — | — | — | — | 350 g (70%) | 271 g (30%) |
| 7 | 195 g (40%) | 211 g (60%) | — | 104 g (60%) | 85 g (40%) | — | — | — | — | — | — |
| 8 | 52 g (1%) | 397 g (99%) | — | — | — | 116 g (45%) | 63 g (25%) | — | 126 g (30%) | — | — |

TMA: 1,2,4-benzenetricarboxylic anhydride,
TPA: Terephthalic acid,
IPA: Isophthalic acid,
EG: Ethylene glycol,
PG: Propylene glycol,
NPG: Neopentyl glycol,
1,4BD: 1,4 butanediol,
DEG: Diethylene glycol,
TEG: Triethylene glycol,
BPA.PO: Bisphenol A propylene oxide (2,2),
BPA.EO: Bisphenol A ethylene oxide (2)

TABLE 2

| Polyester Sample No. | Properties of Polyester | | | | | | |
|---|---|---|---|---|---|---|---|
| | OHV, Value of hydroxyl group KOH mg/g | AV, Value of acidity KOH mg/g | OHV + AV KOH mg/g | Ratio OHV/AV (−) | Glass transition point Tg (°C.) | Softening point Tsp (°C.) | Remark* |
| 1 | 20 | 35 | 55 | 0.6 | 62 | 141 | o |
| 2 | 15 | 17 | 32 | 0.9 | 60 | 140 | o |
| 3 | 50 | 28 | 78 | 1.8 | 57 | 135 | o |
| 4 | 35 | 31 | 66 | 1.1 | 61 | 140 | o |
| 5 | 11 | 31 | 42 | 0.4 | 59 | 144 | o |
| 6 | 57 | 32 | 89 | 1.8 | 68 | 138 | x |
| 7 | 56 | 26 | 82 | 2.2 | 51 | 140 | x |
| 8 | 16 | 12 | 28 | 1.3 | 48 | 125 | x |

(Note)*
o: Invention
x: Comparison

TABLE 3

| Toner No. | Composition of Toner | | | |
|---|---|---|---|---|
| | Binder resin | Carbon black | Releasing agent | Remarks |
| 1 | Polyester 1, 100 parts/wt | Mogal L, 10 parts/wt By Cabot Co. | Polypropylene, penetration 1.5, melting point 142° C., 2 parts/wt. Ethylenebisstearoamide, penetration 2.0, melting point 145° C., 2 parts/wt. | o |
| 2 | Polyester 2, 100 parts/wt | #30 5 parts/wt By Mitsubishi Chem. Co. | Fatty acid ester, penetration 1.0, melting point 83° C., 2 parts/wt. Ethylenebisstearoamide, penetration 2.0, melting point 145° C., 2 parts/wt. | o |
| 3 | Polyester 3, 100 parts/wt | Mogal L, 15 parts/wt By Cabot Co. | Paraffin, penetration 1.0, melting point 108° C., 3 parts/wt. | o |
| 4 | Polyester 1, 100 parts/wt | Mogal L, 10 parts/wt By Cabot Co. | Polyethylene, penetration 3.0, melting point 120° C., 4 parts/wt. | o |
| 5 | Polyester 4, 100 parts/wt | Mogal L, 10 parts/wt By Cabot Co. | Polypropylene, penetration 1.5, melting point 142° C., 2 parts/wt. | o |
| 6 | Polyester 5, 100 parts/wt | Mogal L, 10 parts/wt By Cabot Co. | Paraffin, penetration 1.0, melting point 70° C., 2 parts/wt. Fatty acid ester, penetration 1.0, melting point 83° C., 2 parts/wt. | o |
| 7 | Polyester 1, 100 parts/wt | #30 10 parts/wt By Mitsubishi Chem. Co. | | x |
| 8 | Comp. polyester 1, 100 parts/wt | Mogal L, 10 parts/wt By Cabot Co. | Polypropylene, penetration 1.5, melting point 142° C., 3 parts/wt. | x |
| 9 | Comp. polyester 2, 100 parts/wt | #30 10 parts/wt By Mitsubishi Chem. Co. | Polypropylene, penetration 1.5, melting point 142° C., 3 parts/wt. | x |
| 10 | Comp. polyester 3, 100 parts/wt | Mogal L, 10 parts/wt By Cabot Co. | Polypropylene, penetration 1.5, melting point 142° C., 3 parts/wt. | x |

(Note)*
o: Invention,
x: Comparison

Preparation of Developer

The dual component type developers were prepared by mixing 50 parts by weight of the foregoing toners and 950 parts by weight of carriers comprising of iron powder particles having an average particle size of 120μm.

EXAMPLE 1

(An environmental condition of low temperature and humidity)

Using the foregoing dual component type developers and an electrophotographic copier U-Bix 5500 manufactured by Konica Corporation equipped with an arsenic-selenium type latent-image carrying means, a contact type magnetic brush developing unit (normal development), a heat-roller type fixing unit and a cleaning device having a urethane rubber cleaning blade, the copying tests were performed in a continuous mode, where 50,000 copy images were continuously formed without stopping the copier under conditions of low temperature and humidity (10° C. and RH20%). Then, the following items were evaluated.

(1) Fog

Using a densitometer manufactured by Konica Corp., fog of white area after copying was measured and expressed by a reflecting density relative to that of the white area before copying, which is set at 0.0. The evaluation results were ranked by 'o' when the relative density was less than 0.01, 'Δ' when it is at a range of not lower than 0.01 to lower than 0.03, and 'x' when it is not lower than 0.03, respectively.

(2) Image density

A maximum density of a copy image after 50,000 copies was measured by a densitometer manufactured by Konica Corp. The practical use level thereof is not lower than 0.8.

(3) Toner flying

An inside of a copier and the copy images were inspected visually. The results were ranked by 'o' when almost no toner flying was found, 'Δ' when it was found to some extent but there was no problem in practical use and 'x' when it was found to present a problem in practical use.

(4) Anti-winding property

Solid-black copy images were formed every 10,000 copies and were inspected visually. The results were ranked by 'o' when the images were excellent without having any mark of a separation claw attached to a heat-roller, 'x' when some marks of the separation claw were found, and 'xx' when the marks were obviously visible.

(5) Fixing property

After completion of a 50,000 copy cycle, a solid image of 10mm × 10mm was formed, and the temperatures of both upper and lower fixing-rollers were controlled at 200° C. and 50° C., respectively.

The resulted image was rubbed reciprocatingly 10 times with a fastness tester carrying a sheet of U-Bix 55kg copying paper. A ratio (%) of the reflection densities before and after rubbing was determined as a fixing ratio.

$$\text{Fixing ratio (\%)} = \frac{\text{Reflection density after rubbing}}{\text{Reflection density before rubbing}} \times 100$$

(6) Anti-offset property

The solid images 10mm × 10mm were formed every 10,000 copies the temperatures of both upper and lower fixing-rollers being controlled at 240° C. and 220° C., respectively, and were observed visually. The results were ranked by 'o' when no offset was observed anywhere, and 'x' when it was observed.

(7) Blank area on solid portions

Solid-black copy images formed every 10,000 copies and were inspected visually. The results were ranked by 'o' when the images were excellent without any white spots, and 'x' when white spots were found.

The results are summarized in Table-4.

TABLE 4

(Environmental conditions: 10° C. and 20% RH)

| Developer No. | Fog | Image density | Toner flying | Anti-winding-property | Fixing ratio (%) | Anti-offset property | Blank area in solid portion | Remark |
|---|---|---|---|---|---|---|---|---|
| 1 | Up to 50,000 times o | 1.39 | Up to 50,000 times o | Up to 50,000 times o | 98 | Up to 50,000 times o | Up to 50,000 times o | Inv. |
| 2 | Up to 50,000 times o | 1.38 | Up to 50,000 times o | Up to 50,000 times o | 96 | Up to 50,000 times o | Up to 50,000 times o | Inv. |
| 3 | Up to 50,000 times o | 1.27 | Up to 50,000 times o | Up to 50,000 times o | 90 | Up to 50,000 times o | Up to 50,000 times o | Inv. |
| 4 | Up to 50,000 times o | 1.40 | Up to 50,000 times o | Up to 50,000 times o | 95 | Up to 50,000 times o | Up to 50,000 times o | Inv. |
| 5 | Up to 50,000 times o | 1.40 | Up to 50,000 times o | Up to 50,000 times o | 96 | Up to 50,000 times o | Up to 50,000 times o | Inv. |
| 6 | Up to 50,000 times o | 1.36 | Up to 50,000 times o | Up to 50,000 times o | 99 | Up to 50,000 times o | Up to 50,000 times o | Inv. |
| 7 | After 30,000 times x | 1.00 | After 30,000 times x | After 10,000 times x | 60 | After 10,000 times x | After 20,000 times x | Comp. |
| 8 | After 10,000 times x | 0.72 | After 25,000 times x | After 20,000 times x | 71 | After 20,000 times x | After 20,000 times x | Comp. |
| 9 | After 15,000 times x | 0.81 | After 20,000 times x | After 20,000 times x | 72 | After 20,000 times x | After 20,000 times x | Comp. |
| 10 | After 20,000 times x | 0.95 | After 25,000 times x | After 20,000 times x | 75 | After 30,000 times x | After 1,000 times x | Comp. |

EXAMPLE 2

(Environmental conditions of high temperature and humidity)

The copying tests were carried out in the same manner as in Example-1, except that the environmental conditions were changed to a high temperature of 33° C. and a high humidity of 80%RH. The results were evaluated similarly and the same excellent results as those of Example-1 were obtained.

In particular, Example-2 was superior in the number of blank areas compared to the comparative example.

As can be seen from the above-mentioned results of the examples, the electrostatic-image developing toners of the invention are capable of providing the following advantages:

fine powder is not produced by destroying toner particles; no releasing agent drops off; an excellent and stable development can be carried out for long time: therefore, images with high density can stably be formed over a lot of times without causing fog and toner flying.

Further, excellent anti-offset, anti-winding and fixing properties can also be displayed: and, in particular, excellent images can be formed stably over a large number of copies without causing any blank area on the solid portions even in high temperature and humidity.

What is claimed is:

1. An electrostatic image developing toner containing a polyester prepared by condensation polymerization of a monomer composition consisting essentially of:
Component (1): an at least trivalent aromatic carboxylic acid,
Component (2): an aromatic dicarboxylic acid, and
Component (3): an aliphatic dialcohol,
and a releasing agent having a range of penetration, wherein the total of an acid value (AV) and a hydroxyl value (OHV) of said polyester is not less than 30 and not more than 80, and the ratio of OHV/AV is not more than 5.0.

2. The toner of claim 1 wherein the penetration of said releasing agent is not more than 4.

3. The toner of claim 1 wherein the ratio is not more than 2.0.

4. The toner of claim 3 wherein the ratio if less than 1.2.

5. The toner of claim 1 wherein said polyvalent aromatic carboxylic acid is benzenetricarboxylic acid, its anhydride, or its ester.

6. The toner of claim 1 wherein said Component (3) is a straight or branched chain aliphatic dialcohol having 2 to 10 carbon atoms.

7. The toner of claim 6 wherein the amount of said branched aliphatic dialcohol is not less than 50 mol % based on the total dialcohols.

8. The toner of claim 1 wherein the softening point (Tsp) of the polyester is 90 to 170° C.

9. The toner of claim 8 wherein Tsp is 100 to 160° C.

10. The toner of claim 1 wherein the glass transition point (Tg) of the polyester is 50 to 70° C.

11. The toner of claim 2 wherein the melting point of the releasing agent is 60 to 160° C.

12. The toner of claim 5 wherein the amount of Component (1) is 1 to 30 mol % of the monomer composition.

13. The toner of claim 12 wherein the amount of Component (1) is 1 to 15 mol % of the monomer composition.

14. The toner of claim 11 wherein the amount of the releasing agent is 1 to 20 parts by weight per 100 parts by weight of the polyester.

* * * * *